United States Patent [19]

Cunha et al.

[11] Patent Number: 5,320,483
[45] Date of Patent: Jun. 14, 1994

[54] STEAM AND AIR COOLING FOR STATOR STAGE OF A TURBINE

[75] Inventors: Francisco J. Cunha, Schenectady; R. Paul Chiu, Scotia, both of N.Y.

[73] Assignee: General Electric Company, Schenectady, N.Y.

[21] Appl. No.: 996,931

[22] Filed: Dec. 30, 1992

[51] Int. Cl.⁵ .............................................. F01D 9/06
[52] U.S. Cl. ................... 415/114; 415/115; 415/116; 60/39.05; 60/39.53
[58] Field of Search ............ 415/114, 115, 116; 416/96 R, 96 A, 97 R; 60/39.05, 39.53, 39.54

[56] References Cited

U.S. PATENT DOCUMENTS

| | | |
|---|---|---|
| 2,647,368 | 8/1953 | Triebbnigg et al. |
| 2,750,147 | 6/1956 | Smith . |
| 3,275,294 | 9/1966 | Allen et al. ................ 415/115 |
| 3,533,712 | 10/1970 | Kercher . |
| 3,628,885 | 12/1971 | Sidenstick et al. . |
| 3,729,930 | 5/1973 | Williams . |
| 4,079,587 | 3/1978 | Nordström et al. ........ 415/115 |
| 4,184,797 | 1/1980 | Anderson et al. . |
| 4,314,442 | 2/1982 | Rice . |
| 4,338,780 | 7/1982 | Sakamoto et al. . |
| 4,424,668 | 1/1984 | Mukherjee . |
| 4,514,144 | 4/1985 | Lee . |
| 4,526,512 | 7/1985 | Hook . |
| 4,565,490 | 1/1986 | Rice . |
| 4,697,985 | 10/1987 | Suzuki ........................ 416/96 A |
| 4,807,433 | 2/1989 | Maclin et al. . |
| 4,820,116 | 4/1989 | Hovan et al. . |
| 5,120,192 | 6/1992 | Ohtomo et al. . |
| 5,160,096 | 11/1992 | Perkins et al. . |
| 5,217,348 | 6/1993 | Rup, Jr. et al. .............. 415/115 |

FOREIGN PATENT DOCUMENTS

| | | |
|---|---|---|
| 2540937 | 8/1984 | France ......................... 415/115 |
| 58-202304 | 11/1983 | Japan . |
| 60-3404 | 1/1985 | Japan . |
| 59-126034 | 7/1985 | Japan . |
| 60-135606 | 7/1985 | Japan . |
| 60-206905 | 10/1985 | Japan . |
| 0169601 | 7/1986 | Japan ............................ 416/97 R |
| 728834 | 4/1955 | United Kingdom . |
| 861632 | 2/1961 | United Kingdom . |
| 2042648 | 9/1980 | United Kingdom . |
| 2236145 | 3/1991 | United Kingdom . |

OTHER PUBLICATIONS

"Future Gas Turbine Development Options Definition Study" Electric Power Research Institute, Jun. 1987.
"Development. Installation ... Generator", Burnham et al., pp. 1-8, ASME, International Gas Turbine Conference, Dusseldorf, Germany, Jun. 1986.
"New Advanced Cooling Technology and Material of the 1500° C. Class Gas Turbine" Matsuzaki et al., Int'l Gas Turbine and Aeroengine Congress and Exposition, Cologne, Germany, Jun. 1-4, 1992.

Primary Examiner—Edward K. Look
Assistant Examiner—Christopher Verdier
Attorney, Agent, or Firm—Nixon & Vanderhye

[57] ABSTRACT

The second-stage nozzles include a plurality of stator vanes 10 having first, second, third, fourth and fifth passages 40, 42, 44, 46 and 48, respectively, for cooling the vanes. The first and fourth passages have a steam inlet along an outer sidewall 14 and a junction box 70 along the inner sidewall 12 for returning steam to the second passage 42. The third passage 44 has a contour corresponding to the contour of the leading edge and impingement steam is directed through openings in a partition 52, cooling the leading edge. Steam flows from the third passage 44 directly into the return passage 42 and also into a channel 64 for cooling the inner sidewall 12. Cooling air flows through fifth passage 48 radially inwardly through the inner sidewall 12 into a cavity 72 in the diaphragm 32 for flow axially outwardly into wheel cavities 86 and 88.

18 Claims, 3 Drawing Sheets

STEAM AND AIR COOLING FOR STATOR STAGE OF A TURBINE

TECHNICAL FIELD

The present invention relates to a cooling system for a combined cycle gas turbine and particularly relates to a steam and air cooling system for the stator vanes of a gas turbine.

BACKGROUND OF THE INVENTION

The traditional approach for cooling the rows of gas turbine stator vanes or nozzles has been to extract air from the intermediate stages of the gas turbine compressor. An external piping system is used to supply and control the air flow to the nozzles. In that arrangement, the cooling air circuit bypasses the turbine combustors where heat is supplied to the thermodynamic cycle. As a result, the diverted cooling air does not receive energy directly from the combustors and consequently does not completely expand through the turbine. This arrangement represents parasitic losses to the turbine output and degrades overall performance.

Steam cooling of the vanes of stator blades is not per se new and has been previously discussed, for example, in U.S. Pat. Nos. 4,314,442 and 4,565,490 to Rice. Steam cooling has also been discussed in a report by the Electric Power Research Institute, Report No. RP2620-1, entitled "Future Gas Turbine Development Options Definition Study," dated June, 1987. This report describes the anticipated performance improvement for steam cooling from a thermodynamic cycle analysis perspective. In the context of that report, the steam cooling supply requirements included a very high pressure source, i.e., on the order of 1840 psia, because it was then believed that such high pressure was needed to overcome circuit friction losses, as well as adverse rotational and centrifugal field forces associated with that proposed closed cooling circuit configuration. Nozzle cooling is also the subject matter of prior U.S. patent applications Ser. Nos. 07/794,032, title "Integrated Steam and Air for Combined Cycle Gas Turbines" and filed Nov. 19, 1991, by one of the co-inventors herein and also U.S. patent application Ser. No. 07/854,580, for "Integrated Steam and Air Cooling System for Gas Turbines," filed Mar. 20, 1992, also by the same co-inventor herein.

An alternate design configuration was reported by Matsuzaki et al., titled "New Advanced Cooling Technology and Material of the 1500 Class Gas Turbine," ASME 92-GT-240, 1992, which article describes a high-pressure steam cooling concept for the first-stage nozzle. The cooling concept disclosed in that article consisted of several peripheral cooling apertures in the air foil. The concept was similar to that originally described by Horner in "Development of High Temperature Turbine Subsystem Technology to a Technology Readiness Status Phase II," DOE/FE/1806 76, February, 1980. Both of these concepts, however, are very difficult to implement in complex highly curved air foil shapes. For example, the three-dimensional apertures extending along the periphery of the air foils are difficult to control from a manufacturing standpoint, thus leading to different cooling arrangements for the stator vanes in the gas turbine.

In a combined cycle operation, steam at several pressure and temperature levels is readily available. Coolant air in a gas turbine can be replaced by steam, which is a better cooling medium. Additionally, the problem of degradation of thermal efficiency associated with air as the cooling medium is minimized as air is replaced by steam. The inherently better properties of steam for cooling may also be used to increase the potential for higher firing temperatures in the gas turbine cycle.

DISCLOSURE OF THE INVENTION

According to the present invention, there is provided a closed-circuit steam and open-circuit air cooling system for cooling the second-stage row of stator vanes in a gas turbine. Complexities, however, arise in incorporating a cooling system of this type in a second-stage row of stator vanes as a result of the air foil configuration of the vanes. The air foil vane shape, due to aerodynamic requirements, is curved in a complex manner and can only be defined in three-dimensional space. The complexity of the air foil shape thus in part defines a complexity for the cooling circuit within the stator vanes recognizing that the cooling circuit should, notwithstanding such complexity, provide high heat transfer effectiveness and afford ease of manufacture. Furthermore, it is also necessary to integrate the cooling of the second-stage nozzles with the cooling of the external cavities that surround the nozzle diaphragm and the adjacent rotating turbine wheels. In operation, these turbine wheels may overheat due to possible ingestion of hot gases. Thus, purge air to these cavities is a necessity and requires compressor extraction air. Steam cannot be applied as the cooling medium in these external cavities because of the large loss of thermal efficiency which would result from the injection of high-pressure steam into the moderate pressure levels of the hot gas path. Additionally, the expected large pressure reduction would increase the probability of high flow induced vibrations and acoustic problems. According to the present invention, steam cooling is used to cool most of the nozzle in a closed circuit, while the compression extraction air is also used to cool part of the nozzle and the external cavities, the extraction air forming part of an open circuit used to prevent ingestion of hot gases into the wheel cavity.

In accordance with the present invention, each second-stage stator vane is provided with five generally radially extending interior cavities or passages which extend between the inner and outer sidewalls of the second stator stage. Particularly, supply and return first and second steam flow passages, respectively, are provided within each stator vane. An interior partition divides the first passage from a third passage directly adjacent the leading edge of the vane. This partition corresponds generally to the contour of the leading edge of the vane and hence the third steam passage, closest to the leading edge, has a similar shape corresponding generally to the contour of the leading edge. A plurality of laterally and radially spaced openings are provided through the partition for conducting steam through the openings for impingement cooling of the walls of the vane defining the leading edge. Additionally, a plurality of radially spaced openings are formed adjacent opposite sidewalls of the vane affording communication between the third passage and the second return passage whereby the cooling steam in the third passage flows convectively along the sidewalls of the vane directly into the return passage.

The steam is supplied from a pressure chamber formed in the outer sidewall. The pressure chamber is split by a perforated plate between a steam inlet and steam outlets. Consequently, the innermost wall of the outer sidewall is cooled by the impinging jets of steam, while at the same time steam is supplied from the chamber to the first passage. Within the inner sidewall, there is provided a steam channel for receiving the spent cooling steam from the third passage for cooling the inner sidewall. The channel lies in communication with the second or return passage. Structural ribs may be provided in the passages to enhance heat transfer by increasing the heat exchange contact area. A fourth steam passage in communication with the steam outlet of the chamber lies between the second steam passage and the trailing edge of the vane. Steam flowing through this fourth passage cools the opposite sidewalls of the stator vane. Steam from the first and fourth passages flows through the inner sidewall into a junction box within a cavity in the diaphragm. The junction box lies in communication with the second passage for return of the steam.

A fifth cooling passage is provided between the fourth steam passage and the trailing edge of the vane. Compressor extraction cooling air flows into and through that passage for cooling the trailing edge portions of the vane. Pin fins may be used in the fifth passage to enhance the heat transfer relation. The cooling air flows into the cavity within the diaphragm which has openings for supplying the cooling air to the axially adjacent wheel cavities between the diaphragm and the turbine wheels. This cooling extraction air is thus used to purge hot gases from the wheel cavities to prevent the turbine wheel from locally overheating. Additionally, the air flowing into the diaphragm cavity cools the junction box which receives the cooling steam.

In a preferred embodiment according to the present invention, there is provided a turbine having multiple turbine stages, including a nozzle stage comprising a plurality of stator vanes having circumferentially extending inner and outer sidewalls, with the vanes extending radially therebetween and circumferentially spaced one from the other to define a plurality of nozzles, the vanes having leading and trailing edges and at least one of the vanes having a plurality of generally radially extending interior passages spaced from one another between its leading and trailing edges. First and second passages of the plurality thereof establish generally radially inwardly and outwardly directed first and second steam paths, respectively. Means defining an inlet for flowing steam radially inwardly through the first passage is also provided. A third passage of the plurality of passages within the one vane adjacent the leading edge thereof extends substantially the full radial extent of the one vane and defines a leading edge cooling steam path. Also provided are means establishing communication between the first passage and the third passage including a plurality of radially spaced openings between the first passage and the third passage for directing steam from the first passage into the third passage for impingement cooling of the leading edge of the one vane. Means are also carried by the inner sidewall in communication with the third passage and the second passage defining a path for flowing steam from the third passage to the second passage.

In a further preferred embodiment according to the present invention, there is provided a turbine having multiple turbine stages, including a nozzle stage comprising a plurality of stator vanes having circumferentially extending inner and outer sidewalls, with the vanes extending radially therebetween and circumferentially spaced one from the other to define a plurality of nozzles, the vanes having leading and trailing edges. At least one of the vanes has a plurality of generally radially extending interior passages spaced from one another between the leading and trailing edges and a passage of the plurality thereof for supplying cooling steam generally radially inwardly therealong. Means are provided defining an inlet for flowing steam radially inwardly along the supply passage, with one of the plurality passages including a cooling steam passage within the one vane adjacent the leading edge thereof and extending substantially the full radial extent of the one vane. Also provided are means establishing communication between the steam supply passage and the leading edge cooling steam passage including a plurality of spaced openings therebetween for directing steam from the steam supply passage into the leading edge cooling steam passage for impingement cooling of the leading edge of the one vane. Another of the plurality of passages located between the steam supply passage and the trailing edge of the vane defines an air cooling passage, and means are provided for flowing cooling air radially inwardly along the air passage for cooling the walls of the vane.

Accordingly, it is a primary object of the present invention to provide novel and improved steam and air cooling circuits for cooling the stator vanes of a gas turbine.

BEST MODE FOR CARRYING OUT THE INVENTION

Reference will now be made in detail to a present preferred embodiment of the invention, an example of which is illustrated in the accompanying drawings.

Figure 5:
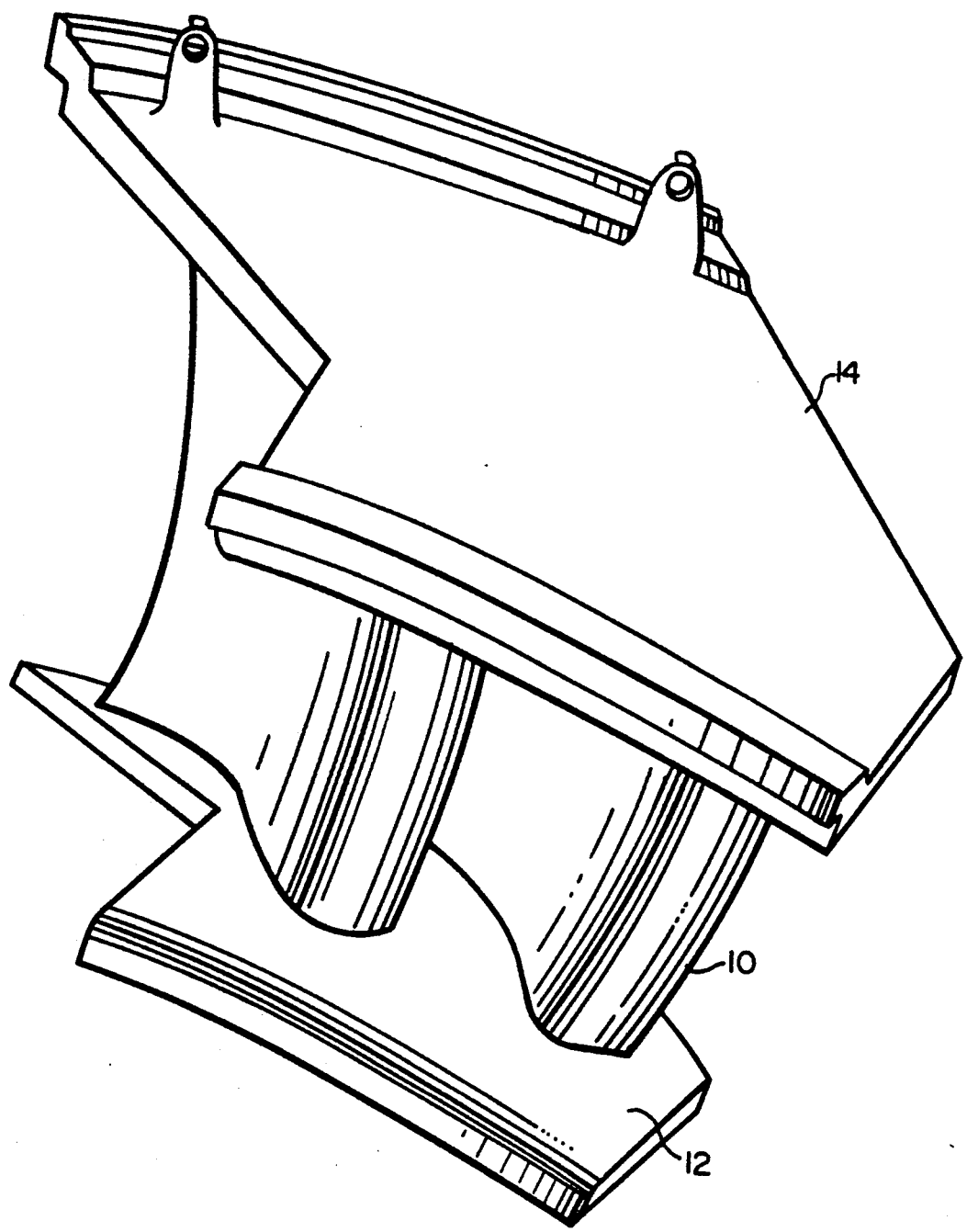
FIG. 5 is a fragmentary enlarged perspective view of a pair of stator vanes extending between inner and outer sidewalls.

Referring now to the drawings, particularly to FIG. 5, there is illustrated a pair of second-stage stator vanes or blades 10 extending generally radially between inner and outer sidewalls 12 and 14, respectively. It will be appreciated that stator vanes 10, as well as sidewalls 12 and 14, extend circumferentially about the axis of a gas turbine and that the stator vanes 10 are circumferentially spaced one from the other to define a plurality of circumferentially spaced nozzles between the stator vanes. The stator vanes 10, as illustrated, have a highly complex air foil shape with multiple compound curved surfaces.

Referring back to FIG. 1, there is illustrated a section of a combined cycle gas turbine, including first and second turbine stages 16 and 18, respectively, on axially opposite sides of the second-stage vanes 10. The turbine blades 20 and 22 of the turbine stages 16 and 18, respectively, are mounted on pedestals 24 and 26, respectively, which in turn are mounted on turbine wheels. A spacer 28 is disposed axially between and secured to the turbine wheels for rotation therewith and includes a sealing surface 30 for sealing against the inner face of a fixed diaphragm 32 forming part of the second-stage nozzle. As illustrated, diaphragm 32 and spacer 28 form a labyrinth seal therebetween. The turbine shaft, not shown, is, of course, attached to the turbine wheels and spacer. It will also be appreciated that gas from turbine combustors, not shown, flows generally axially, for example, from left to right in FIG. 1 through first-stage nozzles, not shown, for driving the first turbine stage blades 20 whereupon the gas flows through the fixed second-stage nozzles 10 for driving the second turbine blades 22.

Figure 1:
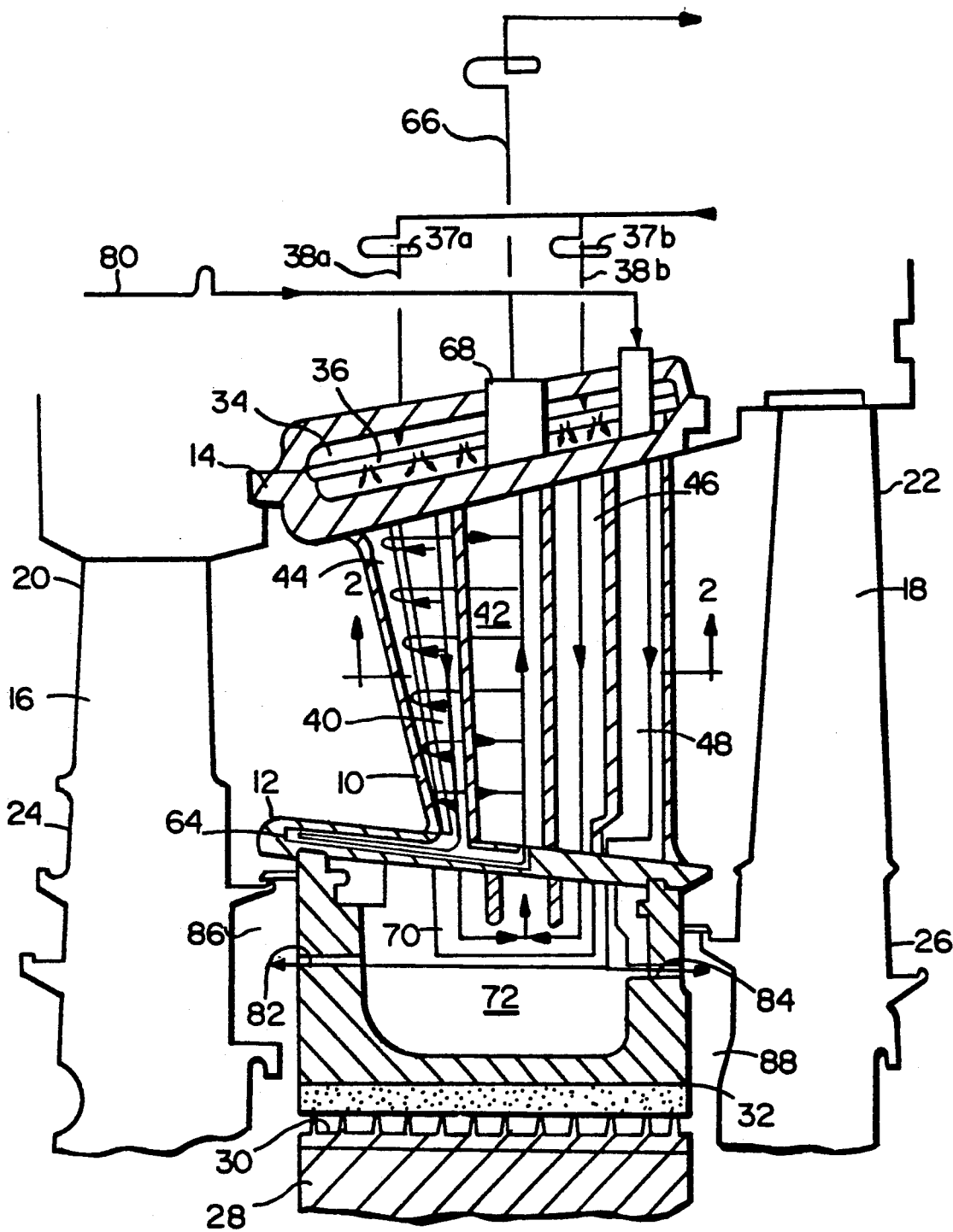
FIG. 1 is a fragmentary partial longitudinal cross-sectional view through the second-stage stator vane of a gas turbine.

Referring to FIG. 1, outer sidewall 14 defines a pressure chamber 34 which is divided by a perforated impingement plate 36. Steam is supplied from a suitable steam manifold, not shown, by way of a pair of branch steam passages 38a and 38b into the chamber 34 on one side of plate 36. Helical and hence flexible pipe couplings 37a and 37b are used to prevent overloading the pipe connections to the nozzle segment. The steam passes through the perforations in plate 36 for impingement cooling of the interior wall of the outer sidewall 14 between nozzles 10. The steam impinging upon the wall surfaces also is supplied within the stator vane for cooling the vane in a manner which will now be described.

Figure 2:
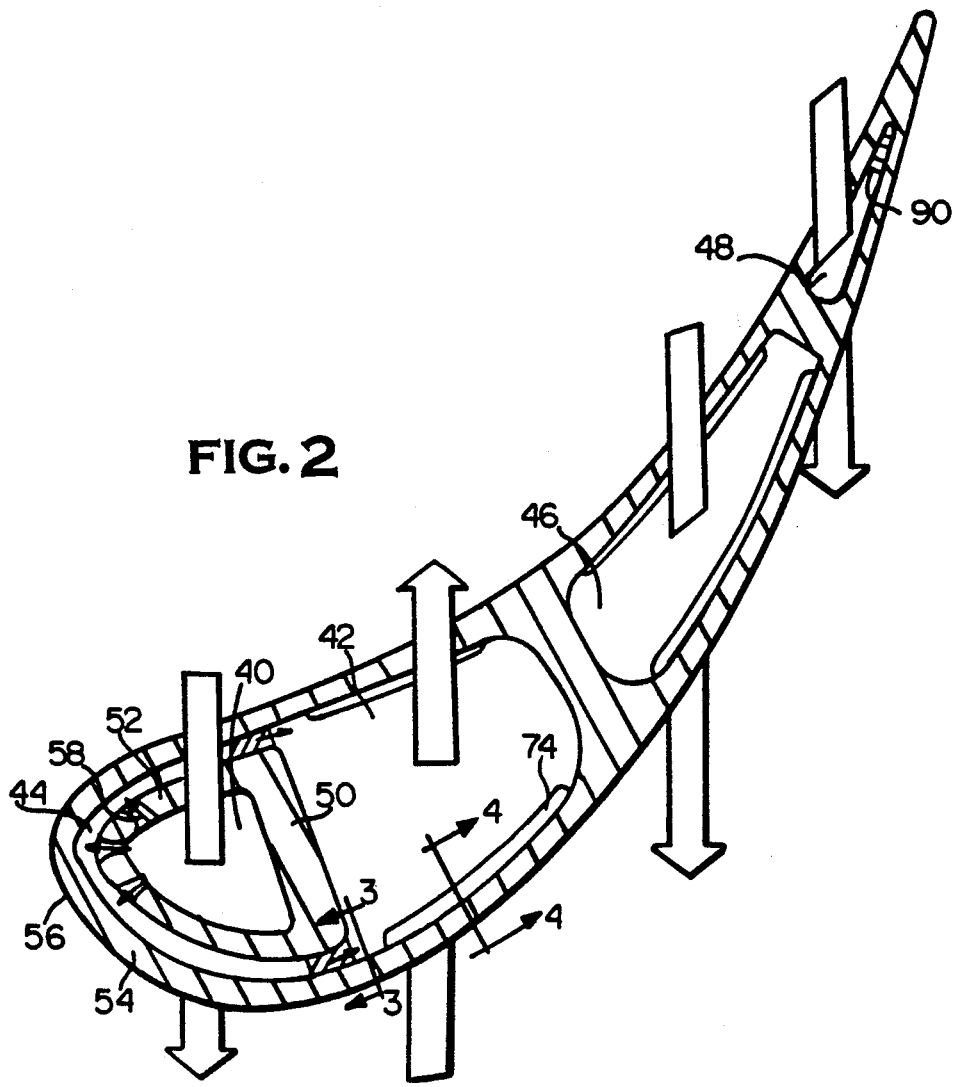
FIG. 2 is an enlarged cross-sectional view of the stator vane illustrated in FIG. 1 and taken generally about on line 2—2 in FIG. 1.
Figure 3:
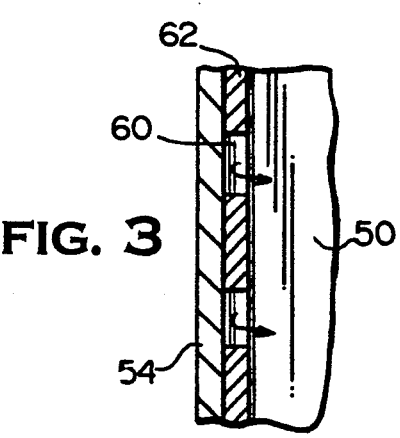
FIG. 3 and 4 are cross-sectional views thereof taken generally about on lines 3—3 and 4—4, respectively, in FIG. 2.
Figure 4:
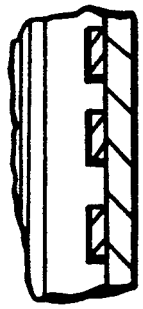

Referring to FIGS. 1 and 2, the vanes are each provided with a first cooling steam supply passage 40, a second return steam passage 42, a third leading edge cooling steam passage 44, a fourth steam passage 46 and an air passage 48. All of the passages extend generally radially of the vane. As best illustrated in FIG. 2, the first steam passage 40 is defined by a rear wall 50 extending between the opposite sidewalls of the vane and an arcuate side and front partition 52 which generally corresponds to the contour of the exterior walls 54 defining the leading edge 56 of the vane. As a consequence of that arrangement, third steam passage 44 is similarly shaped in cross-section as illustrated in FIG. 2 to generally follow the contour of the walls 54 of the leading edge. The side and front partition 52 between the first and third passages has a series of radially and laterally spaced openings 58 defining a series of jets for flowing steam from first passage 40 into third passage 44 for impingement cooling of the walls 54 defining the leading edge of vane 10. As illustrated in FIG. 3, radially spaced openings 60 are provided by spacers 62 between the side partition 52 and the walls of the stator vane whereby steam in third passage 44 may flow rearwardly along the inside of walls 54 of the vane into the second passage 42. Thus, steam within passage 44 flows convectively along the wall surfaces 54 through the openings 60 into the return steam passage 42.

As illustrated in FIG. 1, the inner end of steam passage 44 lies in communication with a cooling channel 64 disposed within the inner sidewall 12. Thus, steam flows from the passage 44 into channel 64. Channel 64 lies in communication with return steam passage 42 and steam flows radially outwardly through passage 42 for return through external piping 66. A collar 68 extends through chamber 34 to collect the steam from return passage 42 for flow to piping 66.

As illustrated in FIG. 1, cooling steam flows from chamber 34 through passage 46 and passes radially inwardly and through the inner sidewall 12 into a junction box 70 within a cavity 72 formed in diaphragm 32. Passage 40 likewise lies in communication with junction box 70. Junction box 70 collects the steam from passages 40 and 46 for flow through the inner sidewall 12 to the return steam passage 42. It will be appreciated that in each of the steam passages 42 and 46, the structural integrity of the sidewalls of the vane can be enhanced, as well as the heat transfer between the sidewalls and the steam flowing through the passages 40 and 42 by providing ribs 74 spaced along the sidewalls of each passage 42 and 46. Flow dividers, not shown, can also be employed in passages 42 and 46 to further enhance the heat exchange relationship.

Extraction air from the intermediate stages of the compressor may be provided via piping 80 to the passage 48 adjacent the trailing edge of the vane. Passage 48 is part of an open cooling circuit which ends in the turbine wheel cavities on opposite sides of diaphragm 32. Particularly, the air passing through passage 40 flows through an aperture in the inner sidewall 12 into the cavity 72 within diaphragm 32. Axial apertures 82 and 84 are provided through the opposite sides of diaphragm 32 for supplying cooling air from passage 48 and cavity 72 into wheel cavities 86 and 88 to prevent ingestion of hot gas. Thus, the cooling air through the vane is used to purge hot gases from the wheel cavities 86 and 88 to prevent the turbine wheels from overheating locally. Note also that once the cooling air enters cavity 72 of diaphragm 32, the air cools the steam flow inside the junction box 70 before the steam is returned through passage 42.

Referring back to FIG. 2, the air passage 48 through the vane 10 is generally triangular in cross-section. A plurality of rows of pin fins 90 may be disposed in passage 48 at radially spaced locations therealong and between the opposite sidewalls of passage 48 to enhance the cooling air/vane heat transfer relation.

From the foregoing, it will be appreciated that both steam and air are employed to cool the stator vanes. Particularly, steam, inlet from a suitable source through chamber 34, which also cools the innermost wall of the outer sidewall 14, is flowed through passages 40 and 46 in a radially inward direction to cool the sidewalls of the vanes. The steam flowing through passage 40 also flows through openings 58 for impingement cooling of the walls 54 defining the leading edges of the vanes. The steam also flows convectively along those walls through openings 60 into return steam passage 42. The steam dumps from the inner end of the passage 44 into a cooling channel 64, which cools the walls of the inner sidewall 12, the steam returning from channel 64 to return passage 42. Steam from the passages 40 and 46 flows through the inner sidewall 12 into junction box 70 for return through passage 42 via collar 68 to piping 66. The extraction cooling air received from an intermediate stage of the compressor flows along passage 46 at the trailing edge of the vane, cooling the sidewalls thereof, and exits into cavity 72 within diaphragm 32. Upon flow axially outwardly through apertures 82 and 84, the air cools the steam within junction box 70, as well as affords cooling in the wheel cavities 86 and 88.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. In a turbine having multiple turbine stages, a nozzle stage comprising:

a plurality of stator vanes having circumferentially extending inner and outer sidewalls, with said vanes extending radially therebetween and circumferentially spaced one from the other to define a plurality of nozzles;

said vanes having leading and trailing edges and at least one of said vanes having a plurality of generally radially extending interior passages spaced form one another between its leading and trailing edges;

first and second passages of said plurality thereof establishing generally radially inwardly and outwardly directed first and second steam paths, respectively;

means providing an inlet for flowing steam radially inwardly through said first passage;

a third passage of said plurality of passages within said one vane adjacent the leading edge thereof and extending substantially the full radial extent of said one vane defining a leading edge cooling steam path;

means establishing communication between said first passage and said third passage including a plurality of radially spaced openings between said first passage and said third passage for directing steam from said first passage into said third passage for impingement cooling of the leading edge of said one vane;

means carried by said inner sidewall and in communication with said third passage and said second passage defining a path for flowing steam from said third passage cavity to said second passage;

said steam inlet means comprising a chamber in said outer sidewall having a steam inlet to said chamber and a steam outlet from said chamber in communication with said first passage, and an impingement plate in said chamber between said steam inlet and said steam outlet and having a plurality of apertures therethrough for impingement steam cooling of the outer sidewall; and means defining a fourth passage extending radially through said one vane and located between said third passage and said trailing edge, and means for flowing cooling steam radially inwardly along said fourth passage for convectively cooling the walls of said one vane, means carried by said inner sidewall and in communication with said fourth passage defining a steam path for flowing steam from said fourth passage to said second passage, and a collar extending through said outer sidewall for receiving return steam from said second passage for flow through said outer sidewall, and a collar extending through said outer sidewall for flowing extraction air through said outer sidewall into said fifth passage.

2. In a turbine having multiple turbine stages, a nozzle stage comprising:

a plurality of stator vanes having circumferentially extending inner and outer sidewalls, with said vanes extending radially therebetween and circumferentially spaced one from the other to define a plurality of nozzles;

said vanes having leading and trailing edges and at least one of said vanes having a plurality of generally radially extending interior passages spaced from one another between its leading and trailing edges;

first and second passages of said plurality thereof establishing generally radially inwardly and outwardly directed first and second steam paths, respectively;

means providing an inlet for flowing steam radially inwardly through said first passage;

a third passage of said plurality of passages within said one vane adjacent the leading edge thereof and extending substantially the full radial extent of said one vane defining a leading edge cooling steam path;

means establishing communication between said first passage and said third passage including a plurality of radially spaced openings between said first passage and said third passage for directing steam from said first passage into said third passage for impingement cooling of the leading edge of said one vane;

means carried by said inner sidewall and in communication with said third passage and said second passage defining a path for flowing steam form said third passage cavity to said second passage; and means defining a fourth passage extending radially through said one vane and located between said third passage and said trailing edge, and means for flowing cooling steam radially inwardly along said fourth passage for convectively cooling the walls of said one vane, and means carried by said inner sidewall and in communication with said fourth passage defining a steam path for flowing steam form said fourth passage to said second passage.

3. A nozzle stage according to claim 2 wherein said means carried by said inner sidewall define a junction box located radially inwardly of said inner sidewall, means defining a fifth passage extending radially through said one vane at a location between said fourth passage and said trailing edge, means for flowing cooling air radially inwardly along said fifth passage for cooling the walls of said vane, said turbine including first and second-stage turbine wheels on opposite sides of said stator stage, a diaphragm between said turbine wheels defining a cavity radially inwardly of said inner sidewall, said fifth passage lying in communication with said diaphragm cavity, said diaphragm cavity lying in heat-exchange relation with said junction box whereby air from said fifth passage cools the steam in said junction box.

4. A nozzle stage according to claim 2 wherein said turbine includes first and second-stage turbine wheels on opposite sides of said stator stage, a diaphragm between said turbine wheels and defining with said turbine wheels wheel cavities on opposite sides of said diaphragm, means defining a fifth passage extending radially through said one vane at a location between said fourth passage and said trailing edge, and means for supplying air from said fifth passage into said wheel cavities.

5. A nozzle stage according to claim 2 including means defining a fifth passage extending radially through said one vane at a location between said fourth passage and said trailing edge, a plurality of pins extending across said fifth passage at radially spaced locations therealong for promoting heat exchange between the walls of said vanes and the air flowing through said fifth passage.

6. In a turbine having multiple turbine stages, a nozzle stage comprising:

a plurality of stator vanes having circumferentially extending inner and outer sidewalls, with said vanes extending radially therebetween and circumferentially spaced one from the other to define a plurality of nozzles;

said vanes having leading and trailing edges and at least one of said vanes having a plurality of generally radially extending interior passages spaced from one another between its leading and trailing edges;

first and second passages of said plurality thereof establishing generally radially inwardly and outwardly directed first and second steam paths, respectively;

means providing an inlet for flowing steam radially inwardly through said first passage;

a third passage of said plurality of passages within said one vane adjacent the leading edge thereof and extending substantially the full radial extent of said one vane defining a leading edge cooling steam path;

means establishing communication between said first passage and said third passage including a plurality of radially spaced openings between said first passage and said third passage for directing steam from said first passage into said third passage for impingement cooling of the leading edge of said one vane;

means carried by said inner sidewall and in communication with said third passage and said second passage defining a path for flowing steam form said third passage cavity to said second passage; and means defining a fourth passage extending radially through said one vane and disposed between said third passage and said trailing edge, and said inlet means enabling flow of cooling steam radially inwardly along said fourth passage for convectively cooling the walls of said one vane; and means defining a fifth passage extending radially through said one vane at a location between said fourth passage and said trailing edge, and means for flowing cooling air radially inwardly along said fifth passage for cooling the walls of said vane.

7. In a turbine having multiple turbine stages, a nozzle stage comprising:

a plurality of stator vanes having circumferentially extending inner and outer sidewalls, with said vanes extending radially therebetween and circumferentially spaced one from the other to define a plurality of nozzles;

said vanes having leading and trailing edges and at least one of said vanes having a plurality of generally radially extending interior passages spaced from one another between its leading and trailing edges;

first and second passages of said plurality thereof establishing generally radially inwardly and outwardly directed first and second steam paths, respectively;

means providing an inlet for flowing steam radially inwardly through said first passage;

a third passage of said plurality of passages within said one vane adjacent the leading edge thereof and extending substantially the full radial extent of said one vane defining a leading edge cooling steam path;

means establishing communication between said first passage and said third passage including a plurality of radially spaced openings between said first passage and said third passage for directing steam from said first passage into said third passage for impingement cooling of the leading edge of said one vane;

means carried by said inner sidewall and in communication with said third passage and said second passage defining a path for flowing steam form said third passage cavity to said second passage, said path defining means including means establishing communication at radially spaced locations along said vane between said third passage and said second passage for directing cooling steam from said third passage along interior wall surfaces of said one vane into said second passage in a direction generally normal to the radially direction of said passages for convective cooling of the interior wall surfaces of the vane.

8. A nozzle stage according to claim 7 wherein said third passage is defined in part by a radially extending outer wall surface and a radially extending partition, said radially extending outer wall surface generally conforming to the outer surface contour of said leading edge of said one vane and forming substantially a reverse image of said outer surface contour, said openings being located in said partition to direct cooling steam form said first passage against said outer wall surface for impingement cooling the leading edge of said one vane.

9. A nozzle stage according to claim 7 wherein said openings are located to direct cooling steam from said first passage against said outer wall surface for impingement cooling opposite sidewalls of said one vane adjacent said leading edge, said directing means including a plurality of radially spaced openings along both sides of said vane affording communication between said third passage and said second passage.

10. A nozzle stage according to claim 7 including means defining a fourth passage extending radially through said one vane and disposed between said third passage and said trailing edge, and said inlet means enabling flow of cooling steam radially inwardly along said fourth passage for convectively cooling the walls of said one vane.

11. A nozzle stage according to claim 10 including ribs formed along interior wall surfaces forming part of said fourth passage for increasing the surface area contact with cooling steam for promoting cooling of the vane.

12. A nozzle stage according to claim 7 wherein said steam inlet means comprises a chamber in said outer sidewall having a steam inlet to said chamber and a steam outlet from said chamber in communication with said first passage, and an impingement plate in said chamber between said steam inlet and said steam outlet and having a plurality of apertures therethrough for impingement steam cooling of the outer sidewall.

13. In a turbine having multiple turbine stages, a nozzle stage comprising:

a plurality of stator vanes having circumferentially extending inner and outer sidewalls, with said vanes extending radially therebetween and circumferentially spaced one from the other to define a plurality of nozzles;

said vanes having leading and trailing edges and at least one of said vanes having a plurality of generally radially extending interior passages spaced from one another between said leading and trailing edges;

a passage of said plurality thereof for supplying cooling steam generally radially inwardly therealong;

means providing an inlet for flowing steam radially inwardly along said supply passage;

one of said plurality of passages including a cooling steam passage within said one vane adjacent the leading edge thereof and extending substantially the full radial extent of said one vane;

means establishing communication between said steam supply passage and said leading edge cooling steam passage including a plurality of spaced openings therebetween for directing steam from said steam supply passage into said leading edge cooling steam passage for impingement cooling of the leading edge of said one vane;

another of said plurality of passages located between said steam supply passage and the trailing edge of said vane defining an air cooling passage, and means for flowing cooling air radially inwardly along said air passage for cooling the walls of said vane;

said steam inlet means comprising a chamber in said outer sidewall including a steam inlet to said chamber, a steam outlet from said chamber in communication with said steam supply passage and an impingement plate in said chamber between said steam inlet and said steam outlet and having a plurality of apertures therethrough for impingement steam cooling of the outer sidewall.

14. A nozzle stage according to claim 13 wherein another of said plurality of passages includes a steam return passage for flowing steam radially outwardly of said one vane, an means in communication with said steam supply passage and said return passage for flowing steam from said supply passage to said return passage.

15. A nozzle stage according to claim 13 wherein said leading edge cooling steam passage is defined in part by a radially extending outer wall surface and a radially extending partition, said radially extending outer wall surface generally conforming to the contour of said leading edge of said one vane and forming its reverse side, said openings being located in said partition to direct cooling steam from said steam supply passage against said outer wall surface for impingement cooling the leading edge of said one vane.

16. A nozzle stage according to claim 14 including means establishing communication at radially spaced locations between said leading edge cooling steam passage and said return steam passage for directing cooling steam from said leading edge cooling steam passage along interior wall surfaces of said one vane into said return steam passage.

17. A nozzle according to claim 13 wherein said turbine includes first and second-stage turbine wheels on opposite sides of said stator stage, a diaphragm between said turbine wheels defining a cavity radially inwardly of said inner sidewall and having apertures for communication with wheel cavities on opposite sides of said diaphragm, said air cooling passage lying in communication with said diaphragm cavity and with said wheel cavities through said apertures for heat-exchange relation in said wheel cavities.

18. A nozzle stage according to claim 13 wherein said turbine includes first and second-stage turbine wheels on opposite sides of said stator stage, a diaphragm between said turbine wheels and defining with said turbine wheels wheel cavities on opposite sides of said diaphragm, and means for supplying air from said air cooling passage into said wheel cavities.

* * * * *